(12) United States Patent
Neumann et al.

(10) Patent No.: US 11,529,670 B2
(45) Date of Patent: Dec. 20, 2022

(54) METHOD FOR CUTTING A CAST STRAND OR INTERMEDIATE STRIP USING SHEARS

(71) Applicant: SMS group GmbH, Düsseldorf (DE)

(72) Inventors: Luc Neumann, Düsseldorf (DE); Michael Pander, Cologne (DE); Björn Kintscher, Velbert (DE); Bernhard Ehls, Hilchenbach (DE)

(73) Assignee: SMS group GmbH, Düsseldorf (DE)

( * ) Notice: Subject to any disclaimer, the term of this patent is extended or adjusted under 35 U.S.C. 154(b) by 388 days.

(21) Appl. No.: 16/757,601

(22) PCT Filed: Sep. 24, 2018

(86) PCT No.: PCT/EP2018/075759
§ 371 (c)(1),
(2) Date: Apr. 20, 2020

(87) PCT Pub. No.: WO2019/081142
PCT Pub. Date: May 2, 2019

(65) Prior Publication Data
US 2020/0261965 A1    Aug. 20, 2020

(30) Foreign Application Priority Data
Oct. 27, 2017 (DE) ............ 10 2017 219 289.5

(51) Int. Cl.
*B21J 5/02* (2006.01)
*B21B 15/00* (2006.01)
(Continued)

(52) U.S. Cl.
CPC ........... *B21J 5/027* (2013.01); *B21B 15/0007* (2013.01); *B22D 11/126* (2013.01); *B23D 15/02* (2013.01)

(58) Field of Classification Search
CPC   B26D 2001/0066; B26D 1/085; B26D 1/125; B21B 1/46–466;
(Continued)

(56) References Cited

U.S. PATENT DOCUMENTS 3,492,853 A * 2/1970 Gross .................. B23D 15/02
                                                           72/203
3,585,830 A    6/1971 Mitchell
(Continued)

FOREIGN PATENT DOCUMENTS

EP    0262899 A2    4/1988
EP    0940208 A1    9/1999
(Continued)

OTHER PUBLICATIONS

Makoto, Translation of JP 08132107 (JPH08132107A) (Year: 1996).*
(Continued)

*Primary Examiner* — Adam J Eiseman
*Assistant Examiner* — Bobby Yeonjin Kim
(74) *Attorney, Agent, or Firm* — Maier & Maier, PLLC

(57) ABSTRACT

A method for cutting a cast strand or intermediate strip using shears. In order to facilitate improved rolling of the section having significantly reduced thickness, the method according has the following steps: a) bringing part of the completely solidified cast strand or intermediate strip in the conveying direction (F) of the cast strand or intermediate strip in front of the shears; b) placing a first blade of the shears onto the one surface of the cast strand or intermediate strip and placing a second blade of the shears onto the other surface of the cast strand or intermediate strip and performing a cut by carrying out a relative movement of the two blades, wherein at least one of the blades is in a pushed-
(Continued)

forward position; c) upset forging or upset forging with stamping a wedge-shaped contour on the end of the cast strand.

13 Claims, 3 Drawing Sheets

(51) Int. Cl.
    *B23D 15/02*     (2006.01)
    *B22D 11/126*     (2006.01)

(58) Field of Classification Search
    CPC ........ B21B 2015/0014; B21B 15/0007; B23D 15/02; B23D 35/001
    USPC .................................................. 72/201, 186
    See application file for complete search history.

(56) References Cited

U.S. PATENT DOCUMENTS

| | | |
|---|---|---|
| 4,175,459 A | 11/1979 | Ditges et al. |
| 4,347,724 A | 9/1982 | Brown et al. |

FOREIGN PATENT DOCUMENTS

| | | | |
|---|---|---|---|
| JP | S56-107498 U | | 8/1981 |
| JP | S56105857 A | | 8/1981 |
| JP | 58074202 A | | 5/1983 |
| JP | S59219114 A | | 12/1984 |
| JP | S59224209 A | | 12/1984 |
| JP | S6062407 A | | 4/1985 |
| JP | 08132107 A | * | 5/1996 |
| JP | H08132107 A | | 5/1996 |
| JP | H10180428 A | | 7/1998 |
| JP | 2010-188405 A | | 9/2010 |
| JP | 2014065045 A | | 4/2014 |
| JP | 2016-059940 A | | 4/2016 |
| JP | 2016083662 A | | 5/2016 |
| WO | 2005/070594 A1 | | 8/2005 |

OTHER PUBLICATIONS

Japanese Office Action dated Apr. 28, 2021, in connection with corresponding JP Application No. 2020-522637 (4pp., including machine-generated English translation).

International Search Report Written Opinion with Machine translation dated Nov. 16, 2018 in corresponding International Application No. PCT/EP2018/075759; 19 pages.

International Preliminary Report on Patentability dated Oct. 27, 2017 in corresponding International Application No. PCT/EP2018/075759; 50 pages.

German Office Action dated Jul. 12, 2018 in corresponding Application No. 10 2017 219 289.5; 24 pages.

* cited by examiner

METHOD FOR CUTTING A CAST STRAND OR INTERMEDIATE STRIP USING SHEARS

FIELD

The invention relates to a method for cutting a cast strand or intermediate strip using shears.

BACKGROUND

With continually supplied rolled material, there is cutting into individual pieces, for example in the case of a thin-slab cast rolling mill, before the rolling process, wherein the individual pieces are each rolled into at least one strip.

A method of the aforementioned type is known, for example, from U.S. Pat. No. 4,175,459 A. Similar solutions are disclosed by JP H08 132107 A, JP S59 224209 A and EP 0 940 208 A1.

The grasping condition to be fulfilled to easily move a slab into a rolling mill means that the (Coulomb) friction coefficient must be greater than or equal to the root from the quotient of the reduced thickness to the radius of the rollers of the rolling mill. In practice, friction is a system property which depends on many influencing variables such that grasping angles deviating from the computed grasping angle may result (particularly also smaller grasping angles). The influencing variables include the surface quality (primarily the scale layers), the relative speed, the temperatures, and the material pairing between the workpiece and the tool (working rollers). In particular, the chemical analysis of the workpiece plays a role in material pairing.

In particular, thin slabs often experience a relatively significantly reduced thickness in the first hot-rolling pass, which is the most critical variable for fulfilling the grasping condition. For cases in which the grasping condition is not fulfilled, additional measures are necessary for rolling. This interrupts the desired continual production process and requires manual intervention by operators.

In doing so, a feed can be created with drives, which, in the end, increase the friction after a certain time and thus enable the grasping by the rollers. Another option is to use a different pass schedule and to plan less reduction in the first pass. However, this means that the originally planned hot-strip thickness may not be achieved in certain circumstances.

Preventing problems when fulfilling the grasping condition on the part of the system is technically complex and expensive, because greater working roller diameters must be provided which, in turn, require a greater drive torque, which must be transmitted by means of a stronger drivetrain (drive, gearing, and spindle).

In order to cut-to-length the cast strand and/or the intermediate strip, often pendulum shears are used, which, however, have previously only been used to cut the slab.

Various solutions, which frequently are based on sealing off the still liquid core in the cast strand by means of external shaping, are known in the prior art in order to cut-to-length the cast strand without liquid metal escaping. For recasting the head end of the cast strand, there are further solutions known, which are sometimes based on moveable devices which move during the recasting process. In this regard, reference is made to the aforementioned JP H08 132107 A, to JP 10180428 A, to JP 56105857 A, to JP 58074202 A, to JP 2014 065045 A, and to JP 2016 083662 A. U.S. Pat. No. 4,347,724 A describes a method for recasting long products ("bars", "billets"), with this solution only having limited suitability for flat-product production and namely for the production of thin slabs. In addition, the solution described herein is based on a device having blades, which uses parts which are mated to one another ("male"/"female"). Based on the circular design of the tools proposed herein, the solution described therein is not applicable to processing thin slabs.

In a disadvantageous manner, the aforementioned problems can lead to production interruptions or might mean the rolling of a hot-strip which does not achieve the required dimensions. The equipment-based solutions are expensive and complex to procure and not always easy to retrofit.

SUMMARY

Thus, the object upon which the invention is based is to refine a method of the aforementioned type to the extent that improved rolling of the section with significantly reduced thickness is facilitated. The aforementioned disadvantages should thus be prevented.

The achieving of said object by the invention is characterized in that the method comprises the following steps:
a) bringing part of the completely solidified cast strand or intermediate strip in the conveying direction of the cast strand or intermediate strip in front of the shears;
b) placing a first blade of the shears onto the one surface of the cast strand or intermediate strip and placing a second blade of the shears onto the other surface of the cast strand or intermediate strip and performing a cut by carrying out a relative movement of the two blades, wherein at least one of the blades is in a pushed-forward position;
c) upset forging a wedge-shaped contour on the start of the cast strand or intermediate strip that is in front of the shears in the conveying direction, by pressing an upsetting tool or an upsetting and stamping tool onto both surfaces of the cast strand or intermediate strip such that the thickness of the start of the cast strand or intermediate strip is reduced as compared with the thickness of the cast strand or intermediate strip, wherein part of the upsetting tool or upsetting and stamping tool is formed by one of the blades.

Wherein a separate adjustment option is given for the tool and blade, whereby the upset forging function or upsetting and stamping function can be switched on and off such that the shears can also be used only for cutting.

The upsetting tool in this case may have projections suitable for stamping, said projections making the upsetting process into a combined upsetting and stamping process. The stamping makes the surface of the cast strand and/or intermediate strip at this point shaped such that the friction properties are increased for the subsequent rolling process.

The upset forging or upsetting and stamping of the wedge-shaped contour according to the above step c) is preferably implemented in this case when the at least one blade is still in the pushed-forward position according to above step b).

When upset forging the wedge-shaped contour according to above step c), at least a part of the displaced material of the end of the cast strand can be conveyed into a collection space which is situated in one of the blades of the shears.

After the upset forging of the wedge-shaped contour according to above step c), the blade situated in the pushed-forward position according to above step b) can be pivoted about a horizontal axis according to an advantageous refinement of the invention, said horizontal axis being perpendicular to the conveying direction, before the blade is moved back into its starting position. In this case, it is preferably provided that the pivot angle is between −15° and 15°.

When upset forging the wedge-shaped contour according to above step c), a contour with straight edges can be created, as viewed in a horizontal direction perpendicular to the conveying direction. However, it is also possible that, when upset forging the wedge-shaped contour according to above step c), a contour with rounded edges can be created, as viewed in a horizontal direction perpendicular to the conveying direction.

Pendulum shears can be used as the shears. Furthermore, flying shears or cylindrical shears can be used as the shears.

Preferably, the shears used are those with a mechanical crank drive of the blade or blades.

According to one refinement, it is provided that an adjustment option of the upper and/or lower tool is provided for adaptation to the respectively given cast strand thickness or intermediate strip thickness.

Furthermore, an adjustment option of the upper and/or lower tool may also be provided for setting the minimum upsetting thickness based on the grasping condition calculation.

One refinement provides that measuring and/or process data and/or variables calculated therefrom are transferred from a rolling mill control system via a computer network of a machine controller, wherein the cutting and/or the stamping or upsetting process is controlled by the machine controller as a function of these data.

In this process, the position of all tools to be used for the cutting and/or upset forging can be adapted to the thickness of the cast strand and/or of the intermediate strip.

In this case, the grasping conditions can also be applied in order to adapt the aforementioned tools and/or the parts thereof accordingly in their position.

Advantageously, there is a separate adjustment option for cutting tools and stamping and/or upsetting tools.

The proposed shears are thus designed such that the front face of the slab thickness is tapered by an upsetting and/or stamping process simultaneously with the (thin) slab section in order to facilitate the subsequent rolling.

According to the present concept, with the required slab section, particularly in a thin-slab cast rolling mill, a wedge is thus incorporated, due to an upset forging process, on the front face of the (thin) slab resulting with the next step, by means of the proposed procedure, particularly when using pendulum shears simultaneously with the cutting of the cast strand and/or the slab. This wedge helps to ensure the grasping condition during (hot) rolling; this results in higher utilization and output of the production equipment.

The profile used is wedge-shaped, i.e. upsetting is performed on a wedge-shaped contour. However, this does not necessarily require straight edges (as viewed from the side) of the aforementioned contour. Other geometrical shapes are also possible, for example arc-shaped, polygonal, or circular-segmented edges of the wedge-shaped contour.

Specific reference in this regard is made to pendulum shears, which are described in more detail, for example, in EP 0 940 208 A1.

The shears, which are already available in thin-slab systems anyway, are thus expanded by a function according to the invention which simplifies the fulfillment of the grasping condition during the subsequent rolling. Increased operational safety can thereby be achieved. In special cases, a hot-rolling mill can be designed more favorably (lighter), i.e. a smaller working roller diameter is possible and consequently a less heavy drivetrain.

The proposed method is preferably used with flat products in a thickness range of from 5 mm to 300 mm as well as with corresponding long products, in which there is a similar problem, as is shown above.

In doing so, a design can be provided in which the upset forging of the wedge-shaped contour can be switched on and off; moreover, an adaptation to the current casting thickness and to the minimum upset thickness necessary for the grasping condition of the rolling mill can be provided. Accordingly, when this function is switched off, the shears can typically be operated as before or, when the function is switched on, the explained procedural method can be utilized. The switched-off operating method can then be selected, for example, when it is not necessary based on the pass plans to incorporate the wedge-shaped tapering on the slabs.

The pendulum shears which are preferably used can be constructed modularly, wherein wedge-shaped profiles with a geometry that differs depending on the application case can be implemented in that suitable quick-change devices are provided for the tools.

Typically, the angle of the upsetting plates is selected such that the recasting is self-locking. If the conditions (with low friction, larger angles, or both) are no longer self-locking (close to being self-locking or easily solvable), then the additional measure must be undertaken to roughen the upsetting plates on the workpiece side, to provide ribs, to provide tips, or other suitable measures. A shape curved in a transverse or normal direction can be provided for the stamp geometry, for example, for adapting to the friction conditions or the plastic flow or shearing behavior.

The upper blade of the shears in this case can be adapted to the upsetting function (forging and/or stamping function) such that there is space available, due to the suitable design of the cutter bar, in which the material of the cast strand or of the intermediate strip can flow after the cutting process and during the upsetting process.

In addition, due to the aforementioned pivoting, i.e. particularly due to the pendulum movement of the shears, it can be assured that the pendulum shears lead in the direction of movement of the cut material, after the cutting and upsetting process, in the backward movement of the blade such that the impeding of the backward movement of the blade is prevented by means of the upset volume.

According to one refinement of the invention, it is provided that the maximum force is limited by a suitable measure for protecting the shears carriage.

A suitable controller, which has a suitable data carrier, which may contain a machine code, can be provided for the described upsetting shears. By means of the process planning models and the expected pass plans and other boundary conditions, this controller can automatically decide when the explained upsetting function of the wedge-shaped contour is switched on and off; an adaptation to the current casting thickness and to the minimum upset thickness necessary on the rolling mill side can be implemented by the controller. This type of control can take place based on upstream measurement and process data or based on calculated variables (therefrom) (from a measurement and/or a process model of the casting machine or the specifications for the minimum upset thickness from the process computer of the rolling mill, for example, based on the temperature of the measurement/solidification model or a chemical analysis of the material or of the thickness of the cast strand).

BRIEF DESCRIPTION OF THE DRAWINGS

An exemplary embodiment of the invention is described in the figures. The following is shown.

DETAILED DESCRIPTION

Figure 1:
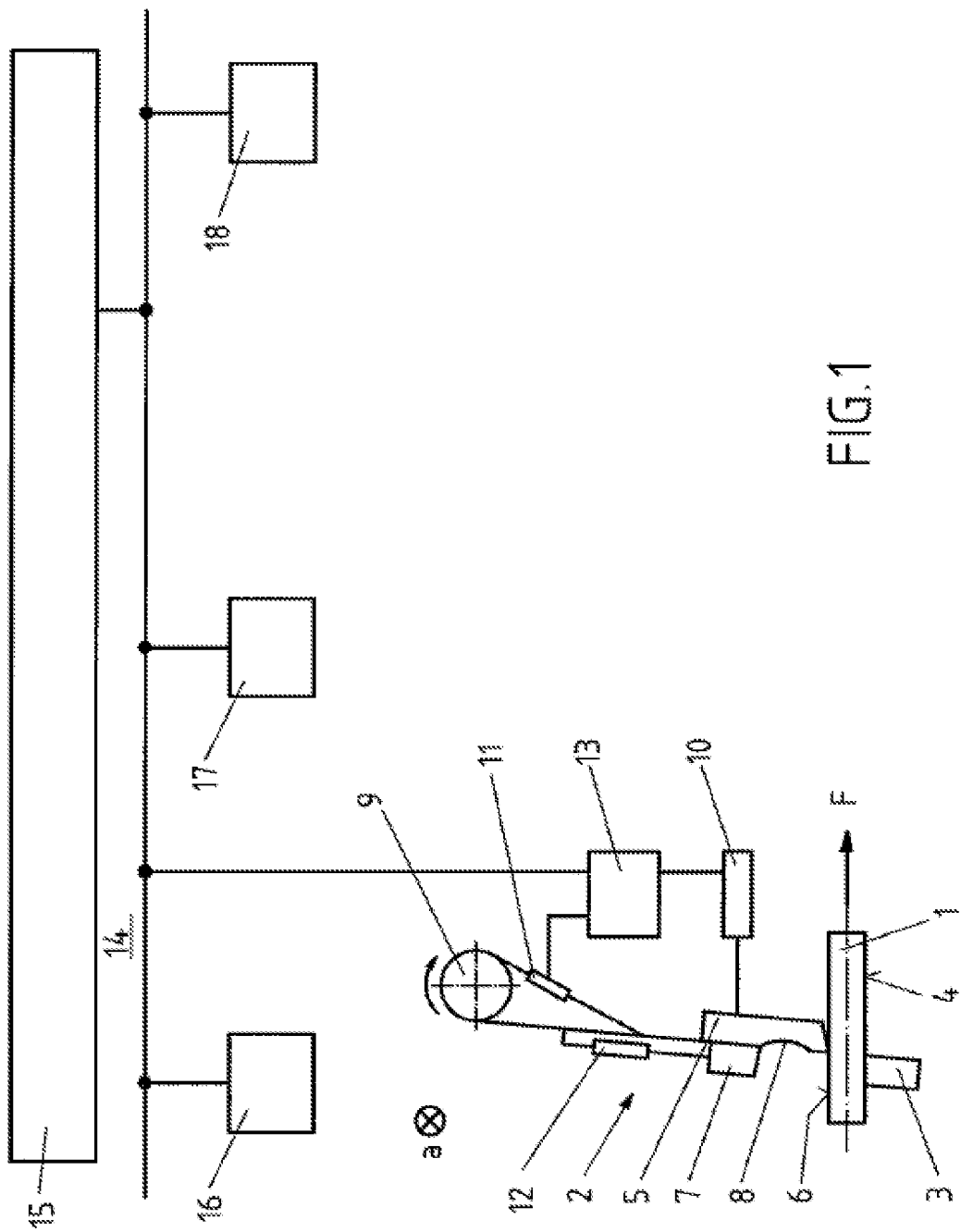
FIG. 1 schematically shows a production system for producing slabs and/or a cast strand or intermediate strip.

FIG. 1 schematically shows the shears 2 of a rolling mill system, with which a section, in the form of a slab or an intermediate strip section, is cut off of a cast strand or intermediate strip 1 in order to subject said section to a rolling process over the further course of the process. The cast strand and/or the intermediate strip 1 in this case is conveyed in a (horizontal) conveying direction F.

The shears 2 have a first (lower) blade 3 and a second (upper) blade 5, said blades being used to implement the cutting process. The shears 2 in this case are designed as pendulum shears; reference is made to EP 0 940 208 A1 for more details regarding this as it contains further information.

In order to implement the cutting process, blade 3 is positioned on the lower surface 4 of the cast strand and/or of the intermediate strip 1. Blade 5 is placed on the upper surface 6 of the cast strand or intermediate strip 1. The cutting process is implemented by means of a relative movement between the two blades 3, 5. In this respect, the procedure corresponds to the prior art.

In the view according to FIG. 1, a machine controller 13 for the shears 2 should be mentioned, which also actuates all adjusting devices 10, 11, and 12. Using adjusting device 10, a pivoting movement of the shearing tools can be created about a pivoting axis a, which is aligned horizontally and is perpendicular to the drawing plane from FIG. 1. The travel path of the blade is adjusted with adjusting device 11, and a part of the upsetting tool is engaged and/or the amount of upsetting is set with adjusting device 12. Preferably, the adjusting devices are designed as a hydraulic cylinder. However, other designs are conceivable, for example, as an electric actuator or linear guide or combination.

FIG. 1 also schematically shows a computer network 14, a higher-level control system 15, a steelwork control system 16, a cast strand control system 17, and a rolling mill control system 18.

The arrangement according to FIGS. 2 to 6 represents upsetting shears, with which the start of the cast strand and/or the intermediate strip 1 is provided with a wedge in order to facilitate the subsequent rolling. The individual figures show the sequence of the procedure of the shears 2.

Figure 2:
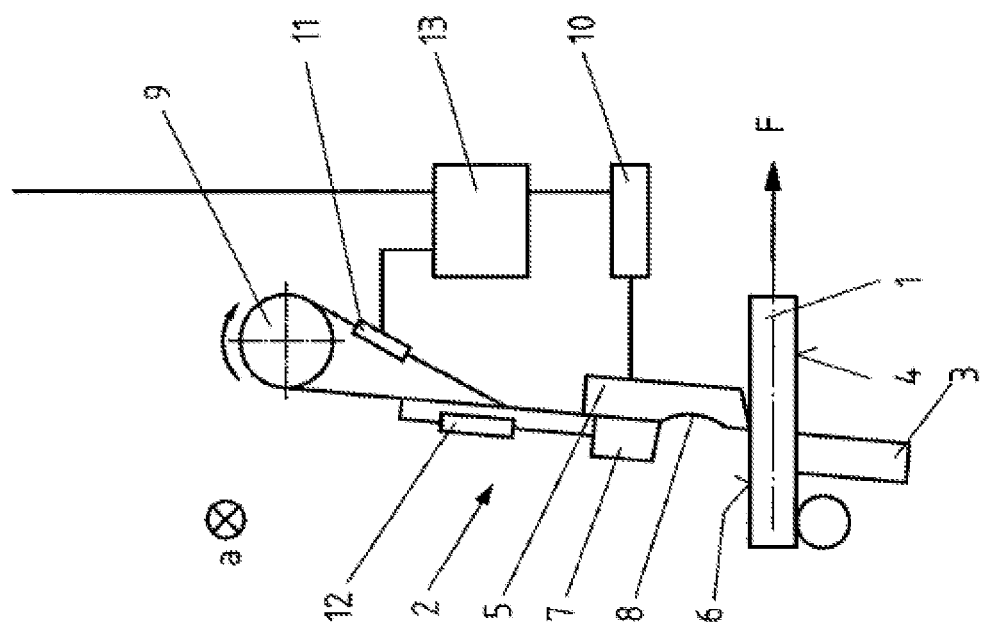
FIG. 2 schematically shows shears as a component of the system according to FIG. 1, wherein the start of a cutting process is shown.

FIG. 2 shows the start of the cutting process. The upper and the lower blades, 5 and 3 respectively, are placed onto the respective surfaces, 6 and 4 respectively, of the cast strand and/or intermediate strip 1. The cut is implemented in that the upper blade 5 is pressed downward. A crank drive 9 is available for this, which actuates blade 5, wherein adjusting device 11 ensures the suitable positioning of the blade relative to the cast strand or the intermediate strip.

Figure 3:
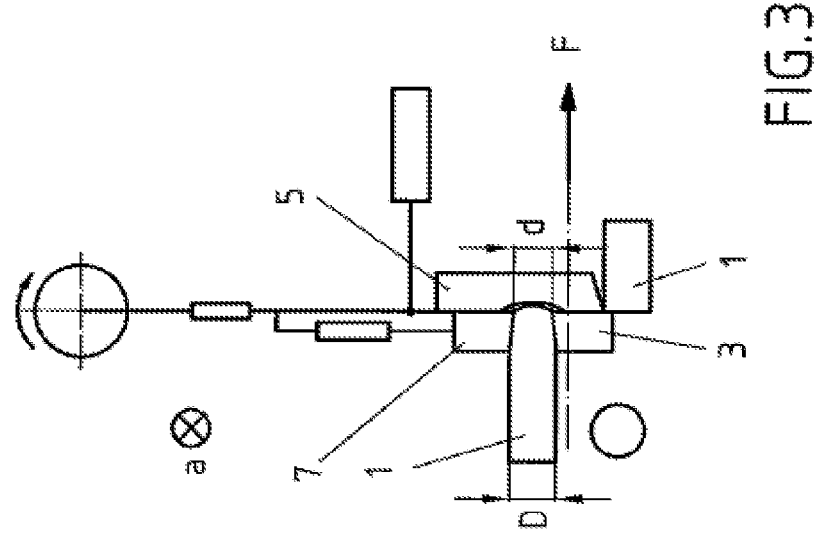
FIG. 3 schematically shows the shears, wherein shown is an upset forging and/or combined upsetting and stamping process of the end of the cast strand, of a slab, or of an intermediate strip.

FIG. 3 shows the essential core of the present invention. According to this, the lower blade 3 functions as a part of an upsetting/stamping tool; another part 7 of an upsetting/stamping tool acts from above in the form of a swage to the extent that a wedge-shaped contour is formed at the start of the cut cast strand or intermediate strip 1, as viewed in the horizontal direction and perpendicular to the conveying direction F, i.e. in the viewing direction of the view according to FIG. 3.

As shown in FIG. 3, thus the thickness D of the cast strand and/or the intermediate strip 1 is reduced to a lower value, namely to thickness d at the end of the cast strand and/or intermediate strip 1, wherein the extent of the reduction can be adjusted via an adjusting device 12.

In this case, a collection space 8 (cavity) is formed in blade 5, said cavity being suitable to receive displaced material from the cast strand and/or intermediate strip 1 which has escaped during the upsetting and/or stamping process.

Figure 4:
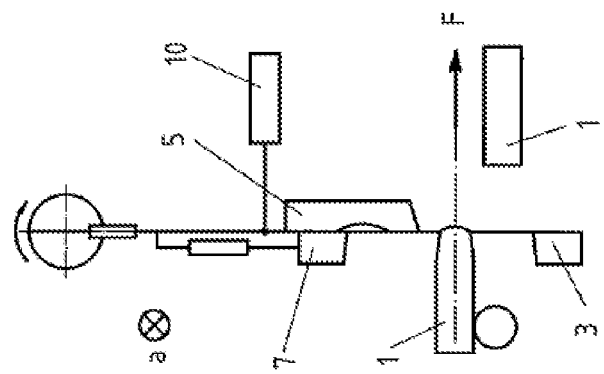
FIG. 4 schematically shows the shears, wherein a return stroke with lateral relief is shown.

FIG. 4 shows that a pivoting movement may occur about the pivoting axis a at a pivot angle □ during the return stroke of blade 5 in order to provide relief to the tool assembly. The pivot angle □ in this case is just a few degrees, which is sufficient, however, for effectively providing the relief. The adjusting cylinder 10 in this case enables the pivoting of the assembly about the pivot angle □.

Figure 5:
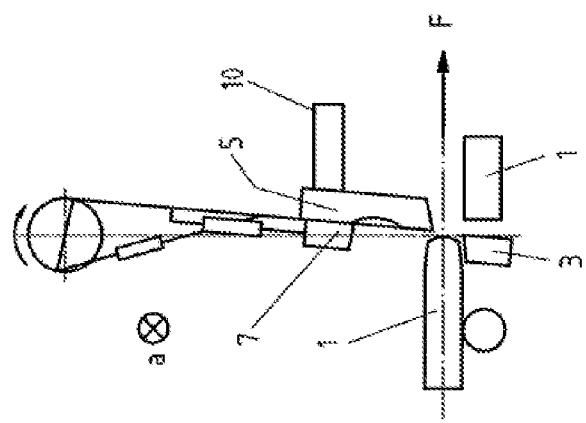
FIG. 5 schematically shows the shears, wherein the opening phase is shown.
Figure 6:
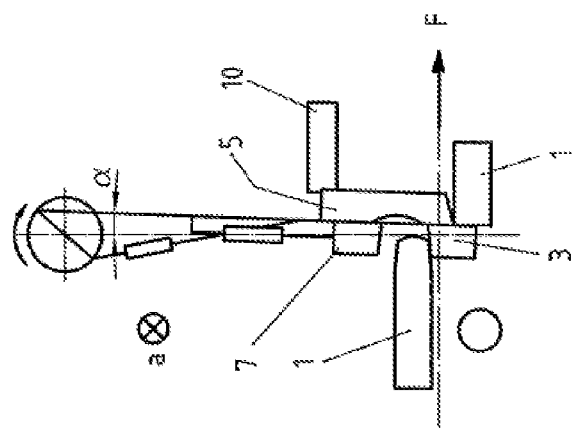
FIG. 6 schematically shows the shears, wherein the movement into the starting position is shown.

The opening phase is shown in FIG. 5. According to FIG. 6, the assembly is guided back into the starting position in order to be ready for the next cut.

The thusly cut cast strand and/or intermediate strip 1 is subsequently rolled. Once the head end has been provided with the wedge-shaped contour during cutting with shears and thus has a reduced thickness d, there will be improved pull-in conditions for rolling, i.e. the grasping condition will be easier to fulfil.

The figures show that the end of the cast strand 2 has a wedge-shaped contour, which has straight edges (as seen in the views according to the figures). However, there may also be round or polygonal sections, which thus do not necessarily have to be linear (straight).

The invention claimed is:

1. A method for cutting a cast strand or intermediate strip using shears,
   which comprises the following steps:
   a) bringing part of a completely solidified cast strand or intermediate strip in front of the shears in a conveying direction of the cast strand or intermediate strip;
   b) placing a first blade of the shears onto a surface of the cast strand or intermediate strip and placing a second blade of the shears onto an other surface of the cast strand or intermediate strip and performing a cut by carrying out a relative movement of two blades, wherein at least one of the blades is in a pushed-forward position;
   c) upset forging or upsetting with stamping of a wedge-shaped contour on an end of the cast strand or intermediate strip that is in front of the shears in the conveying direction, by pressing an upsetting tool or an upsetting and stamping tool onto both surfaces of the cast strand or intermediate strip such that a thickness (d) of a start of the cast strand or intermediate strip is reduced as compared with a thickness (D) of the cast strand or intermediate strip, wherein part of the upsetting tool or upsetting and stamping tool is formed by one of the blades,
   d) providing a separate adjustment option for the tool and blade, whereby the upset forging function or upsetting and stamping function is switched on and off such that the shears are used only for cutting.

2. The method according to claim 1, wherein the upset forging or upsetting with stamping of the wedge-shaped contour takes place according to step c) while the at least one blade is still in the pushed-forward position according to step b).

3. The method according to claim 2, wherein at least a part of the displaced material of the end of the cast strand or intermediate strip is conveyed into a collection space, which is situated in one of the blades, during the upset forging or upsetting with stamping of the wedge-shaped contour according to step c).

4. The method according to claim 1, wherein, after the upset forging or upsetting with stamping of the wedge-shaped contour according to step c), the blade situated in the pushed-forward position according to step b) is pivoted about a horizontal axis (a), which is perpendicular to the conveying direction (F), before the blade is moved back into its starting position.

5. The method according to claim 4, wherein the pivot angle (a) is between −15° and 15°.

6. The method according to claim 1, wherein, during the upset forging or upsetting with stamping of the wedge-shaped contour according to step c) a contour with straight edges is created, as viewed in a horizontal direction perpendicular to the conveying direction (F).

7. The method according to claim 1, wherein, during the upset forging or upsetting with stamping of the wedge-shaped contour according to step c) a contour with round edges is created, as viewed in a horizontal direction perpendicular to the conveying direction (F).

8. The method according to claim 1, wherein pendulum shears are used as the shears.

9. The method according to claim 1, wherein flying shears or cylindrical shears are used as the shears.

10. The method according to claim 1, wherein the shears used are those with a mechanical crank drive of the blade or blades.

11. The method according to claim 1, wherein an adjustment option of an upper portion of the tool and/or a lower portion of the tool is provided for adaptation to the respectively given cast strand thickness or intermediate strip thickness.

12. The method according to claim 1, wherein an adjustment option of an upper portion of the tool and/or a lower portion of the tool is provided for adjusting the minimum upsetting thickness based on a grasping condition computation.

13. The method according to claim 1, wherein measurement and/or process data and/or variables calculated from the measurement and/or process data are transferred from a rolling mill control system via a computer network of a machine controller, wherein the cutting and/or the upset forging or upsetting and stamping process is controlled by the machine controller as a function of these data.

\* \* \* \* \*